US009873330B2

(12) United States Patent
Atsumi et al.

(10) Patent No.: US 9,873,330 B2
(45) Date of Patent: Jan. 23, 2018

(54) POWER FEEDING STRUCTURE, RESIN PLATE BODY FOR WINDOW INCLUDING POWER FEEDING STRUCTURE, AND METHOD OF MANUFACTURING RESIN PLATE BODY FOR WINDOW INCLUDING POWER FEEDING STRUCTURE

(71) Applicant: ASAHI GLASS COMPANY, LIMITED, Tokyo (JP)

(72) Inventors: Toshihiro Atsumi, Tokyo (JP); Mitsurou Watanabe, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 102 days.

(21) Appl. No.: 15/096,598

(22) Filed: Apr. 12, 2016

(65) Prior Publication Data

US 2016/0221442 A1    Aug. 4, 2016

Related U.S. Application Data

(63) Continuation of application No. PCT/JP2014/076537, filed on Oct. 3, 2014.

(30) Foreign Application Priority Data

Oct. 16, 2013    (JP) ................................ 2013-215855

(51) Int. Cl.
*B60L 1/00*    (2006.01)
*B60L 3/00*    (2006.01)
(Continued)

(52) U.S. Cl.
CPC .......... *B60L 1/02* (2013.01); *B29C 45/14639* (2013.01); *B60J 1/002* (2013.01);
(Continued)

(58) Field of Classification Search
USPC ............................................ 307/9.1; 219/203
See application file for complete search history.

(56) References Cited

U.S. PATENT DOCUMENTS 5,023,403 A * 6/1991 Eckardt ............. B32B 17/10036
174/94 R
6,043,782 A   3/2000 Dishart et al.
(Continued)

FOREIGN PATENT DOCUMENTS

DE    603 04 485 T2    10/2006
EP    1 901 392 A1    3/2008
(Continued)

OTHER PUBLICATIONS

3M, "3M ™ Anisotropic Conductive Films", Mar. 3, 2013, pp. 1-2, XP055367914.
(Continued)

*Primary Examiner* — Adam Houston
(74) *Attorney, Agent, or Firm* — Foley & Lardner LLP

(57) ABSTRACT

A power feeding structure includes a resin plate body for window configured by stacking a resin panel and a resin film including an object to have power fed such that the object to have power fed is interposed between the resin panel and the resin film, and an electrical conductive portion that contacts the object to have power fed and is provided inside the resin plate body for window, the power feeding structure feeding power to the object to have power fed via the electrical conductive portion that is provided at a resin sheet that is provided inside the plate body such that the electrical conductive portion is interposed between the resin sheet and the object to have power fed, the resin panel and the resin sheet being adhered, and resin components contained in the object to have power fed and the electrical conductive portion, respectively, being adhered.

15 Claims, 8 Drawing Sheets

(51) Int. Cl.
*H02G 3/00* (2006.01)
*B60L 1/02* (2006.01)
*H01Q 1/12* (2006.01)
*B29C 45/14* (2006.01)
*B60J 1/00* (2006.01)
*B60J 1/08* (2006.01)
*B60J 1/18* (2006.01)
*B60J 7/043* (2006.01)
*B29K 69/00* (2006.01)
*B29K 701/12* (2006.01)
*B29K 705/10* (2006.01)
*B29K 705/14* (2006.01)
*B29L 31/30* (2006.01)

(52) U.S. Cl.
CPC . *B60J 1/08* (2013.01); *B60J 1/18* (2013.01); *B60J 7/043* (2013.01); *H01Q 1/1271* (2013.01); *B29K 2069/00* (2013.01); *B29K 2701/12* (2013.01); *B29K 2705/10* (2013.01); *B29K 2705/14* (2013.01); *B29K 2995/0026* (2013.01); *B29L 2031/3052* (2013.01); *B60Y 2410/12* (2013.01)

(56) References Cited

U.S. PATENT DOCUMENTS

| | | | |
|---|---|---|---|
| 6,103,999 A | 8/2000 | Nishio et al. | |
| 7,220,471 B1* | 5/2007 | Oami | B29C 45/14811 283/109 |
| 7,223,939 B2* | 5/2007 | Hoepfner | H05B 3/84 219/203 |
| 8,109,782 B2* | 2/2012 | Ziegler | H05B 3/84 439/382 |
| 2006/0096967 A1* | 5/2006 | Weiss | H05B 3/84 219/203 |
| 2006/0099833 A1 | 5/2006 | Mann | |
| 2007/0075627 A1* | 4/2007 | Kimura | H01L 27/3213 313/503 |
| 2007/0152896 A1 | 7/2007 | Schwenke | |
| 2008/0062112 A1* | 3/2008 | Umezaki | G09G 3/342 345/100 |
| 2008/0136990 A1* | 6/2008 | Kimura | G02F 1/134363 349/46 |
| 2008/0225061 A1* | 9/2008 | Kimura | G09G 3/3233 345/690 |
| 2013/0236710 A1* | 9/2013 | Honda | C23C 16/483 428/212 |
| 2014/0060921 A1 | 3/2014 | Reul et al. | |
| 2015/0093629 A1* | 4/2015 | Sayre | H01M 2/0262 429/156 |
| 2015/0125679 A1* | 5/2015 | Ishikawa | C23C 16/402 428/216 |
| 2015/0181653 A1* | 6/2015 | Lesmeister | H05B 3/06 219/203 |
| 2016/0221442 A1* | 8/2016 | Atsumi | H01Q 1/1271 |
| 2016/0311402 A1* | 10/2016 | Suetsugu | B60S 1/026 |
| 2016/0359219 A1* | 12/2016 | Araki | H01Q 1/1278 |
| 2017/0131445 A1* | 5/2017 | Koyama | G02B 5/208 |

FOREIGN PATENT DOCUMENTS

| | | |
|---|---|---|
| JP | H09-180769 A | 7/1997 |
| JP | 2000-006654 A | 1/2000 |
| JP | 2007-110216 A | 4/2007 |
| JP | 2009-522878 A | 6/2009 |
| JP | 2014-116298 A | 6/2014 |
| WO | WO-2012/136411 A1 | 10/2012 |

OTHER PUBLICATIONS

EPO-TEK, "EPO-TEK E3001-HV Technical Data Sheet", Epoxy Technology, Aug. 1, 2007, p. 1, XP055367923.
International Search Report for PCT/JP2014/076537 dated Dec. 22, 2014.

* cited by examiner

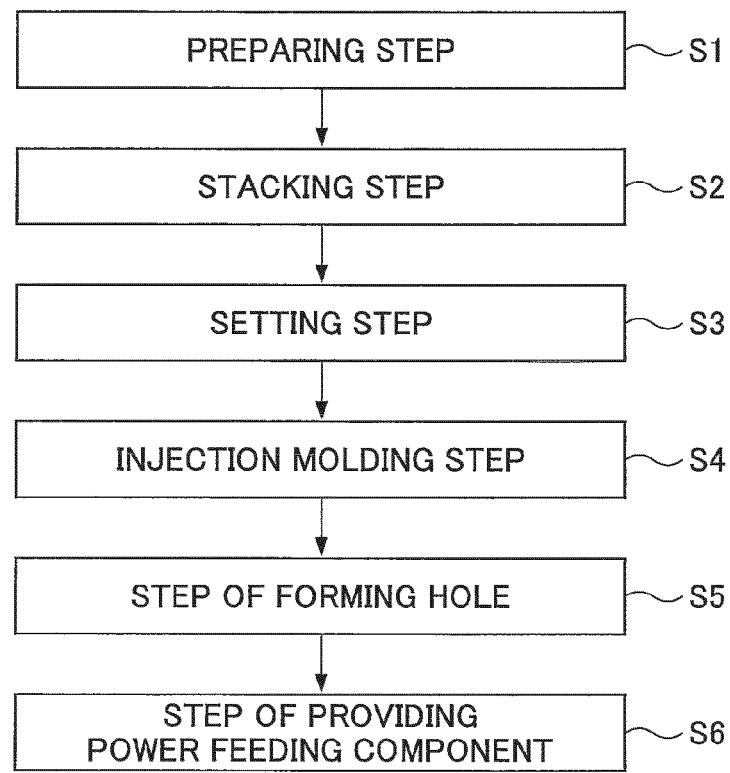
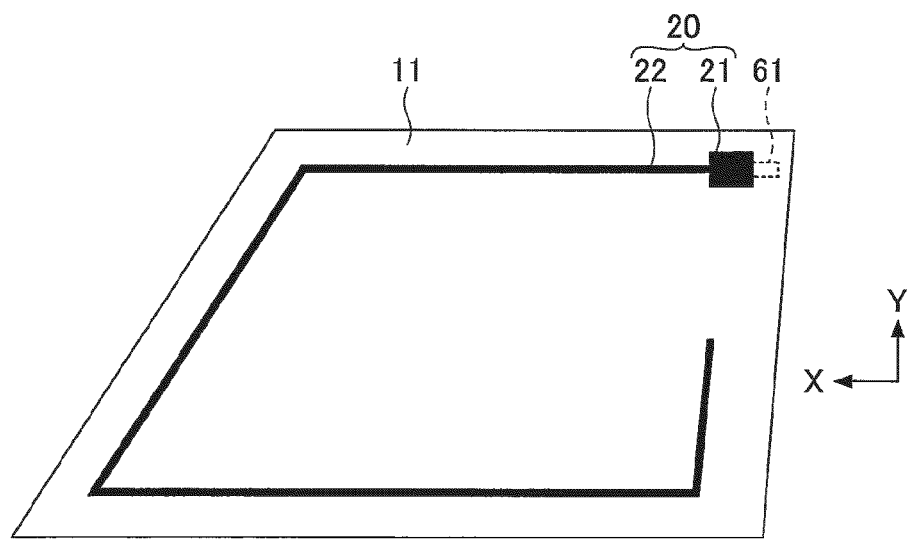

POWER FEEDING STRUCTURE, RESIN
PLATE BODY FOR WINDOW INCLUDING
POWER FEEDING STRUCTURE, AND
METHOD OF MANUFACTURING RESIN
PLATE BODY FOR WINDOW INCLUDING
POWER FEEDING STRUCTURE

CROSS-REFERENCE TO RELATED
APPLICATION

This application is a continuation application filed under 35 U.S.C. 111(a) claiming the benefit under 35 U.S.C. 120 and 365(c) of PCT International Application No. PCT/JP2014/076537 filed on Oct. 3, 2014, which is based upon and claims the benefit of priority of Japanese Priority Application No. 2013-215855 filed on Oct. 16, 2013, and the entire contents of which are hereby incorporated by reference.

BACKGROUND OF THE INVENTION

1. Field of the Invention

The present invention relates to a power feeding structure and a resin plate body for window including the power feeding structure. Further, the present invention relates to a method of manufacturing a resin plate body for window including a power feeding structure.

2. Description of the Related Art

Recently, in order for lightening or the like, a resin plate body for window is started to be used instead of a window glass, in particular, for vehicles. For the resin plate body for window, it is difficult to print an electrical conductor such as a glass antenna or the like at a surface of the resin plate body by printing a silver paste and baking it, similarly as the window glass. Thus, the resin plate body for window including an electrical conductor is configured by interposing a printed electrical conductor formed at a surface of a resin film between the resin film and a resin panel. In such a case, as the printed electrical conductor is sealed inside the resin plate body for window, it is difficult to feed electrical power to the printed electrical conductor.

As a power feeding structure for such a resin plate body for window including an electrical conductor, a structure is known in which an opening is formed at a resin film, and power is fed to the printed electrical conductor via an electrical conductive portion that contacts the printed electrical conductor at the opening and that is provided inside of a resin window (see Patent Document 1, for example). Patent Document 1 discloses a metal foil as such an electrical conductive portion.
[Patent Document]
[Patent Document 1] Japanese Laid-open Patent Publication No. 2000-6654

However, according to the conventional technique, as the metal foil is adhered to the resin panel whose coefficient of expansion is different from that of the metal foil, it is difficult to ensure a stable adhesion between the metal foil and the resin panel. Thus, in the conventional technique, it is necessary to fix the metal foil and the resin panel by a tapping screw when providing a terminal. Further, according to the above described conventional technique, as the metal foil is just connected to the printed electrical conductor, it is difficult to ensure a stable adhesion between the metal foil and the printed electrical conductor.

SUMMARY OF THE INVENTION

The present invention is made in light of the above problems, and provides a power feeding structure, a resin plate body for window including the power feeding structure and a method of manufacturing a resin plate body for window including a power feeding structure in which stable adhesion of an electrical conductive portion that contacts an object to have power fed provided inside the resin plate body for window is ensured.

According to an embodiment, there is provided a power feeding structure including a resin plate body for window configured by stacking a resin panel and a resin film at which an object to have power fed is provided such that the object to have power fed is interposed between the resin panel and the resin film, and an electrical conductive portion that contacts the object to have power fed and is provided inside the resin plate body for window, the power feeding structure feeding power to the object to have power fed via the electrical conductive portion, the electrical conductive portion being provided at a resin sheet, the resin sheet being provided inside the plate body such that the electrical conductive portion is interposed between the resin sheet and the object to have power fed, the resin panel and the resin sheet being adhered, and resin components contained in the object to have power fed and the electrical conductive portion, respectively, being adhered with each other.

Further, according to another embodiment, there is provided a method of manufacturing a resin plate body for window including a power feeding structure, including: a preparing step of preparing a resin film at which an object to have power fed is provided, and a resin sheet at which an electrical conductive portion is provided; a stacking step of stacking the resin film and the resin sheet such that the electrical conductive portion is interposed between the object to have power fed and the resin sheet; a setting step of setting the resin film on which the resin sheet is stacked at an injection die; an injection molding step of injecting molten resin in the injection die; and a step of forming hole, after the injection molding step, of forming a power feeding hole from a surface of the resin film to reach the electrical conductive portion.

According to the embodiment, stable adhesion of an electrical conductive portion that contacts an object to have power fed provided inside a resin plate body for window can be ensured.

BRIEF DESCRIPTION OF THE DRAWINGS

FIG. 3 is a flowchart illustrating an example of a method of manufacturing the resin plate body for window including the power feeding structure;

FIG. 4 is a plan view of a resin film at which an object to have power fed is provided;

DETAILED DESCRIPTION OF THE PREFERRED EMBODIMENTS (Structure of Resin Plate Body for Window Including Power Feeding Structure 100)

Figure 1:
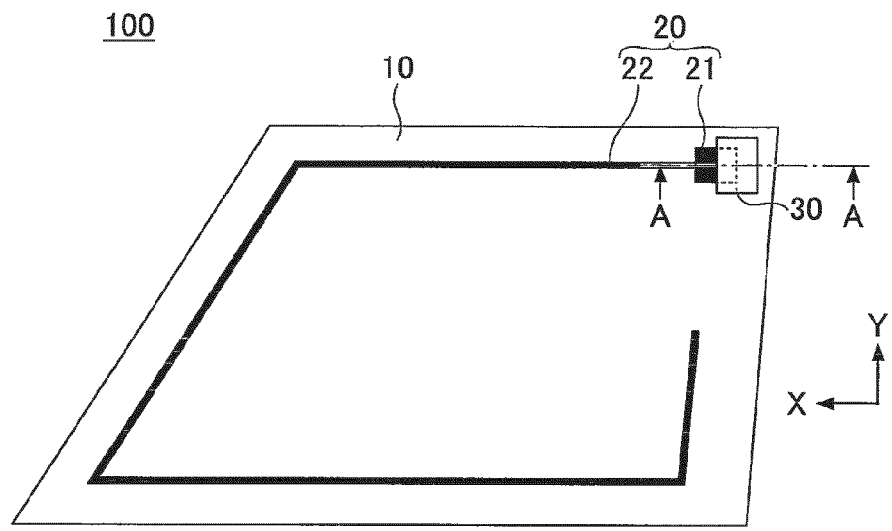
FIG. 1 is a plan view of a resin plate body for window including a power feeding structure of an embodiment.

FIG. 1 is a plan view of a resin plate body for window with a power feeding structure 100 of the embodiment. Hereinafter, the "resin plate body for window including the power feeding structure" is referred to as a "plate body with a power feeding structure". The plate body with the power feeding structure 100 is an example of a plate body with a power feeding structure for a side window attached at a side surface of an automobile. Here, the plate body with the power feeding structure of the embodiment is not limited to outlines illustrated in the drawings, and may be one that is used for a window for a vehicle attached to the vehicle such as an automobile or the like, may be one that is used for a rear window attached to a rear portion of the vehicle, and one that is used for a roof window (sunroof) attached to a ceiling portion of the vehicle, for example.

In this embodiment, the plate body with the power feeding structure 100 is a resin plate body for window 10 including an electrical conductor pattern 20. The resin plate body for window 10 is a transparent or semitransparent plate member that is attached to a window frame of a vehicle, and is a member including a resin layer. Specifically, the resin plate body for window 10 is a resin plate body for window in which a resin panel and a resin film at which the electrical conductor pattern 20 is provided are stacked such that the electrical conductor pattern 20 is interposed therebetween. The electrical conductor pattern 20 is a planar electrical conductor that is provided at the resin plate body for window 10.

The electrical conductor pattern 20 includes a linear electrical conductor 22 and a power feeding portion 21. The linear electrical conductor 22 is an electrical conductor that is formed at the resin plate body for window 10, and the power feeding portion 21 is an electrical conductor for feeding power to the linear electrical conductor 22. The power feeding portion 21 is electrically connected to the linear electrical conductor 22 and is formed wider than the linear electrical conductor 22. Here, the shape of the electrical conductor pattern 20 is not limited to that illustrated in the drawings and the electrical conductor pattern 20 may be arbitrarily formed in other shapes.

Although it is described that the linear electrical conductor 22 and the power feeding portion 21 are formed such that they are provided inside the resin plate body for window 10, the linear electrical conductor 22 may be formed at a surface of the resin plate body for window 10. When the linear electrical conductor 22 is formed at the surface of the resin plate body for window 10, the linear electrical conductor 22 may be electrically connected to the power feeding portion 21 that is provided inside the resin plate body for window 10 by capacitive coupling, for example.

When the electrical conductor pattern 20 is an antenna electrical conductor, for example, the linear electrical conductor 22 corresponds to an antenna element or a feeder to an antenna element. Further, when the electrical conductor pattern 20 is a defogger that prevents fog of the resin plate body for window 10, for example, the linear electrical conductor 22 corresponds to a heater line. The electrical conductor pattern 20 may be used for other purposes.

The power feeding portion 21 is not limited to a portion for feeding power to a linear element such as the linear electrical conductor 22, and may be a portion for feeding power to an arbitrary electrical conductor such as an electrical conductive film or the like formed at the resin plate body for window 10. Here, feeding power may mean to feed power to an electrical conductor such as the linear electrical conductor 22 or the like, or may mean receiving power from an electrical conductor such as the linear electrical conductor 22 or the like.

A power feeding component 30 is electrically connected to the power feeding portion 21. The power feeding component 30 is a terminal component used for feeding power to the electrical conductor pattern 20, and feeds power to the electrical conductor such as the linear electrical conductor 22 or the like via the power feeding portion 21. To the power feeding component 30, an electrical wire, not illustrated in the drawings, such as a wire harness or the like of a vehicle is connected. When the electrical conductor pattern 20 is an antenna electrical conductor, for example, the power feeding component 30 is connected to a receiver mounted on the vehicle via the electrical wire, and when the electrical conductor pattern 20 is a defogger, for example, the power feeding component 30 is connected to a power source or ground mounted on the vehicle via the electrical wire. Further, when the electrical conductor pattern 20 is an antenna electrical conductor, the power feeding component 30 may be a component including a signal processing circuit such as an amplifier or the like. Further, the power feeding component 30 may be just an electrical conductive metal terminal for electrically connecting the electrical wire and the power feeding portion 21.

Figure 2:
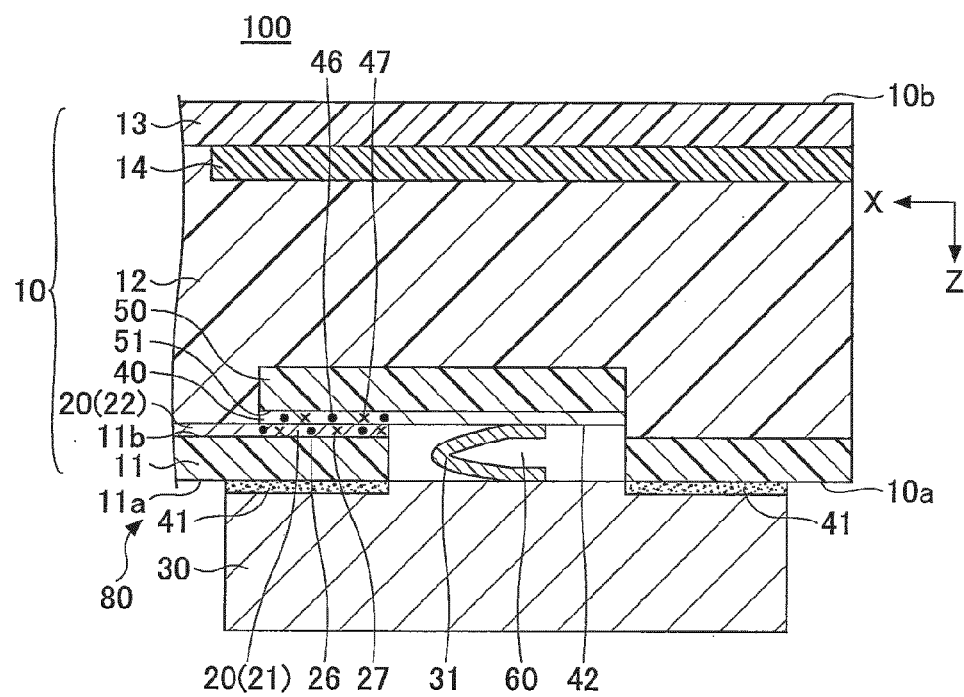
FIG. 2 is a partial cross-sectional view of the resin plate body for window including the power feeding structure of the embodiment.

FIG. 2 is a cross-sectional view of the plate body with the power feeding structure 100 taken along A-A of FIG. 1. In FIG. 2, a lower side is inside of a vehicle, and a upper side an outside of the vehicle. The plate body with the power feeding structure 100 is the resin plate body for window 10 including a power feeding structure 80.

The power feeding structure 80 includes an electrical conductive portion 40 that contacts a surface of the power feeding portion 21 of the electrical conductor pattern 20 provided inside the resin plate body for window 10, and is configured to feed power to the power feeding portion 21 of the electrical conductor pattern 20 via the electrical conductive portion 40. The surface of the power feeding portion 21 which the electrical conductive portion 40 contacts is an inside surface of the resin plate body for window 10 of two surfaces of the power feeding portion 21 in a thickness direction Z of the resin plate body for window 10. Here, the thickness direction Z is a direction to view the resin plate body for window in a plan view and is a direction parallel to a Z axis, for the illustrated case.

The electrical conductor pattern 20 is an example of an object to have power fed to which power is fed by the power feeding structure 80 via the electrical conductive portion 40. When the power feeding portion 21 is provided inside the resin plate body for window 10 and the linear electrical conductor 22 is not provided inside the resin plate body for window 10, the power feeding structure 80 feeds power to the power feeding portion 21, to which the linear electrical conductor 22 is electrically connected, via the electrical conductive portion 40 and feeds power to the linear electrical conductor 22 via the power feeding portion 21.

The electrical conductive portion 40 is provided at a resin sheet 50 and is an example of an electrical conductive portion that contacts the object to have power fed provided inside the resin plate body for window 10. The electrical conductive portion 40 is an electrical conductive layer that overlaps and contacts a surface of the power feeding portion 21 of the electrical conductor pattern 20 in the thickness direction Z, and is an electrical conductor provided inside the resin plate body for window 10.

The power feeding structure 80 includes the resin sheet 50 provided inside the resin plate body for window 10 such that the electrical conductive portion 40 is interposed between the power feeding portion 21 of the electrical conductor pattern 20 and the resin sheet 50. The resin sheet 50 is an example of a resin sheet provided inside the resin plate body for window 10 such that the electrical conductive portion that contacts the object to have power fed provided inside the resin plate body for window 10 is interposed between the object to have power fed and the resin sheet.

The resin sheet 50 is a resin sheet provided with a surface 51 that contacts a surface of the electrical conductive portion 40 opposite from the power feeding portion 21. The surface 51 is a surface that faces the power feeding portion 21 among the surfaces of the resin sheet 50 in the thickness direction Z. The resin sheet 50 may be a transparent polycarbonate sheet, for example, or may be a multiple layered sheet combined with another material. The resin sheet 50 is a resin material provided to be encapsulated in the resin panel 12. By forming the resin sheet 50 with a resin component similar to that of the resin panel 12, a stable adhesion can be obtained as the resin sheet 50 and the resin panel 12 are strongly adhered.

The resin panel 12 is a resin panel placed inside the resin plate body for window 10, and is an injection molded resin material. The resin panel 12 is a transparent polycarbonate plate, for example.

As the electrical conductive portion 40 is interposed between the power feeding portion 21 of the electrical conductor pattern 20 and the resin sheet 50 provided inside the resin panel 12, a stable adhesion of the electrical conductive portion 40 is ensured. For example, by providing the resin sheet 50, size of a portion at which the electrical conductive portion 40 and the resin panel 12 contact can be made small. For the case of FIG. 2, the electrical conductive portion 40 does not include a portion that is adhered to the resin panel 12 in the thickness direction Z, and includes only a portion that is adhered to the resin panel 12 in a direction parallel to the XY plane that is perpendicular to the thickness direction Z. As such, as the size of the portion at which the electrical conductive portion 40 and the resin panel 12 contact is made small, even when the coefficients of expansion of the electrical conductive portion 40 and the resin panel 12 are different, the electrical conductive portion 40 can be stably held by the resin panel 12.

Further, as the coefficient of expansion of the resin sheet 50 is the same or close to that of the resin panel 12, a difference between the coefficients of expansion of the resin sheet 50 and the resin panel 12 is smaller than a difference between the coefficients of expansion of the electrical conductive portion 40 and the resin panel 12. Thus, by providing the resin sheet 50 between the electrical conductive portion 40 and the resin panel 12, distortion generated in the resin panel 12 due to a difference between the coefficients of expansion of the electrical conductive portion 40 and the resin panel 12 can be reduced.

Further, the electrical conductive portion 40 and the resin sheet 50 of the power feeding structure 80 are provided inside the resin plate body for window 10. Thus, even in a relative large shaking environment such as a vehicle or the like, durability of the plate body with the power feeding structure 100 can be ensured.

Further, a resin component 26 contained in the power feeding portion 21 of the electrical conductor pattern 20 and a resin component 46 contained in the electrical conductive portion 40 are adhered (stuck) in the power feeding structure 80. As the resin components of the resin component 26 and the resin component 46 are adhered (stuck), a stable adhesion of the electrical conductive portion 40 can be ensured. For example, compared with a case when the power feeding portion 21 and the electrical conductive portion 40 simply make contact, adhesion strength between the power feeding portion 21 and the electrical conductive portion 40 can be increased. Further, as the adhesion strength between the power feeding portion 21 and the electrical conductive portion 40 is increased, even when the resin panel 12 that contacts the electrical conductor pattern 20 or the electrical conductive portion 40 is deflected, conductivity between the power feeding portion 21 of the electrical conductor pattern 20 and the electrical conductive portion 40 can be surely ensured.

Here, in FIG. 2, "•" schematically indicates a resin component and "x" schematically indicates a metal component. This is the same for other drawings.

The resin plate body for window 10 is configured as a resin layer in which the resin film 11 and the resin panel 12 are stacked. The electrical conductor pattern 20, the electrical conductive portion 40 and the resin sheet 50 are provided between the resin film 11 and the resin panel 12. The resin panel 12 is adhered to a part of an inside surface 11b of the resin film 11. The resin film 11 is a resin film provided with an outside surface 11a that is exposed inside of the vehicle and an inside surface 11b that is opposite from the outside surface 11a. The outside surface 11a is also a surface 10a of the resin plate body for window 10 at inside of the vehicle. A hard coat process may be performed on the outside surface 11a. The electrical conductor pattern 20 is planarly formed on the inside surface 11b. The resin film 11 may be a transparent polycarbonate film, for example, or may be a multiple layered film combined with another material.

The power feeding portion 21 and the linear electrical conductor 22 of the electrical conductor pattern 20 are printed electrical conductors planarly formed by screen printing of electrical conductive ink on the inside surface 11b of the resin film 11, for example. The electrical conductive ink is configured to include silver, which is an electrical conductive material (copper, gold, nickel, carbon, aluminum or the like is also usable). The resin film 11 has a thickness greater than or equal to 120 μm and less than or equal to 250 μm. By setting the thickness greater than or equal to 120 μm, wrinkles are hardly generated when performing injection molding. The electrical conductor pattern 20 is thinner than the resin film 11 and has a thickness greater than or equal to 7 μm and less than or equal to 45 μm. Although the thickness depends on a required resistance value, by setting within this range, the electrical conductor pattern 20 can be stably formed by screen printing.

Similarly as the electrical conductor pattern 20, the electrical conductive portion 40 may be planarly formed on the surface 51 of the resin sheet 50, for example, and may be a printed electrical conductor that is planarly formed on the surface 51 of the resin sheet 50 by screen printing electrical conductive ink. When the electrical conductive portion 40 is the printed electrical conductor, stable adhesion of the electrical conductive portion 40 can be easily ensured, in particular, a stable adhesion between the electrical conductive portion 40 and the resin sheet 50 can be improved. The electrical conductive ink is configured to include silver, which is an electrical conductive material (copper, gold, nickel, carbon, aluminum or the like is also usable). The resin sheet 50 has a thickness greater than or equal to 120 μm and less than or equal to 250 μm, the electrical conductor pattern 20 is thinner than the resin sheet 50 and has a thickness greater than or equal to 7 μm and less than or equal to 45 μm.

The power feeding structure 80 is provided with a power feeding hole 60 as a hole for feeding power from the surface 10a of the resin plate body for window 10 to reach the electrical conductive portion 40, for example. The surface 10a is a surface at the power feeding portion 21 of the electrical conductor pattern 20 side with respect to the electrical conductive portion 40, among the surfaces 10a and 10b of the resin plate body for window 10 in the thickness direction Z. By providing the power feeding hole 60, even when the power feeding portion 21 of the electrical conductor pattern 20 is provided inside the resin plate body for window 10, it is easy to feed power to the power feeding portion 21 via the power feeding hole 60 and the electrical conductive portion 40 from outside the resin plate body for window 10.

For the case of FIG. 2, the power feeding hole 60 is formed from the outside surface 11a to penetrate the resin film 11 to reach the surface 42 of the electrical conductive portion 40 that faces the power feeding portion 21. The number of the power feeding holes 60 is not limited to one and a plurality of holes may be formed. Further, the shape of the power feeding hole 60 may be a circle, a polygon or other arbitrarily selected shapes.

The power feeding structure 80 includes the power feeding component 30 electrically connected to the power feeding portion 21 of the electrical conductor pattern 20 via the power feeding hole 60 and the electrical conductive portion 40. As the power feeding hole 60 is provided, even when the power feeding portion 21 of the electrical conductor pattern 20 is provided inside the resin plate body for window 10, it is easy to feed power to the power feeding portion 21 via the power feeding hole 60 and the electrical conductive portion 40 by electrically connecting the power feeding component 30 to the power feeding portion 21. For example, it is easy for the power feeding component 30 to electrically conductively contact the surface 42 of the electrical conductive portion 40 at the power feeding portion 21 side via the power feeding hole 60.

For the case of FIG. 2, the power feeding component 30 is provided at the outside surface 11a of the resin film 11 via an adhesive material 41. The outside surface 11a is the surface 10a of the resin plate body for window 10 at which the power feeding hole 60 is provided. The adhesive material 41 is provided between the resin film 11 and the power feeding component 30 and is an adhesive layer for adhering the resin film 11 and the power feeding component 30. As a specific example of the adhesive material 41, an adhesive agent, an adhesive tape or the like may be used. The power feeding component 30 can be easily attached and fixed to the outside surface 11a of the resin film 11 by the adhesive material 41. Further, as the power feeding component 30 can be attached to the resin plate body for window 10 without using a tapping screw by using the adhesive material 41, durability of the power feeding structure 80 and the resin plate body for window 10 can be improved.

Further, under a state that the power feeding component 30 is not provided at the resin plate body for window 10, there are no protrusions that protrude from the surfaces 10a and 10b of the resin plate body for window 10, portability of the resin plate body for window 10 is improved.

The power feeding component 30 conductively contacts the surface 42 of the electrical conductive portion 40 via a contacting portion 31 provided in the power feeding hole 60 formed at the resin plate body for window 10, for example. It is possible to further easily conductively connect the power feeding component 30 and the electrical conductive portion 40 by the contacting portion 31.

The contacting portion 31 is a portion (component) at the power feeding component 30 side, and is provided to protrude from a surface of the power feeding component 30 at the power feeding portion 21 side. However, the contacting portion 31 may not be a portion at the power feeding component 30 and may be a portion (component) at the electrical conductive portion 40 side, and may be provided to protrude from the surface 42 toward the power feeding portion 21 side. Further, the contacting portion 31 may be a single component or a portion (component) configured with a plurality of members including members not illustrated in the drawings.

It is preferable that the contacting portion 31 is an electrical conductive elastic body because durability in assembling the power feeding component 30 and the resin plate body for window 10 is improved while a sufficient electrical conductivity between the power feeding component 30 and the electrical conductive portion 40 is ensured. The power feeding component 30 may be fixed to the outside surface 11a by the adhesive material 41 under a state that the contacting portion 31 is elastically deformed while being in contact with the surface 42 of the electrical conductive portion 40. With this configuration, even when the resin plate body for window 10 is oscillated due to a shaking of a vehicle or the like, sufficient electrical conductivity between the power feeding component 30 and the electrical conductive portion 40 and durability can be ensured by absorbing oscillation by deformation of the contacting portion 31. As a specific example of the elastic contacting portion 31, a leaf spring, a spring coil, a rubber or the like may be used.

The power feeding component 30 may conductively contact the electrical conductive portion 40 via an electrical conductive adhesive agent. For example, the contacting portion 31 can be adhered to the electrical conductive portion 40 and/or the power feeding component 30 by an electrical conductive adhesive agent such as an electrical conductive adhesive agent, solder or the like, or the contacting portion 31 may be substituted for by an electrical conductive adhesive agent such as an electrical conductive adhesive agent, solder or the like.

Further, the resin plate body for window 10 may include a concealing layer 14 that conceals a part of the electrical conductor pattern 20 and the electrical conductive portion 40 in a plan view in the thickness direction Z from outside toward inside of the vehicle at an opposite side of the power feeding portion 21 with respect to the electrical conductive portion 40 (this means at the resin sheet 50 with respect to the electrical conductive portion 40). The part of the electrical conductor pattern 20 concealed by the concealing layer 14 is a part or the entirety of the power feeding portion 21, for example. For the case of FIG. 2, the concealing layer 14 is formed at the film with a concealing layer 13 that is provided opposite side of the power feeding portion 21 with respect to the electrical conductive portion 40. The film with the concealing layer 13 is bonded to the resin panel 12 and the concealing layer 14 is interposed between the resin panel 12 and the film with the concealing layer 13. The film with the concealing layer 13 is a transparent polycarbonate film, for example. The concealing layer 14 may be black paint, for example.

(Method of Manufacturing Plate Body with Power Feeding Structure 100)

FIG. 3 is a flowchart illustrating an example of a method of manufacturing the plate body with the power feeding structure 100.

As illustrated in FIG. 4, a preparing step of step S1 of FIG. 3 is a step of preparing the resin film 11 provided with the electrical conductor pattern 20, and the resin sheet 50 provided with the electrical conductive portion 40. The preparing step of step S1 is a step of forming the electrical conductor pattern 20 by printing electrical conductive ink on the resin film 11, for example. Further, the step is a step of forming the electrical conductive portion 40 by printing electrical conductive ink on the resin sheet 50. The step may include a step of baking the electrical conductive ink or a step of drying and evaporating solvent.

Figure 5:
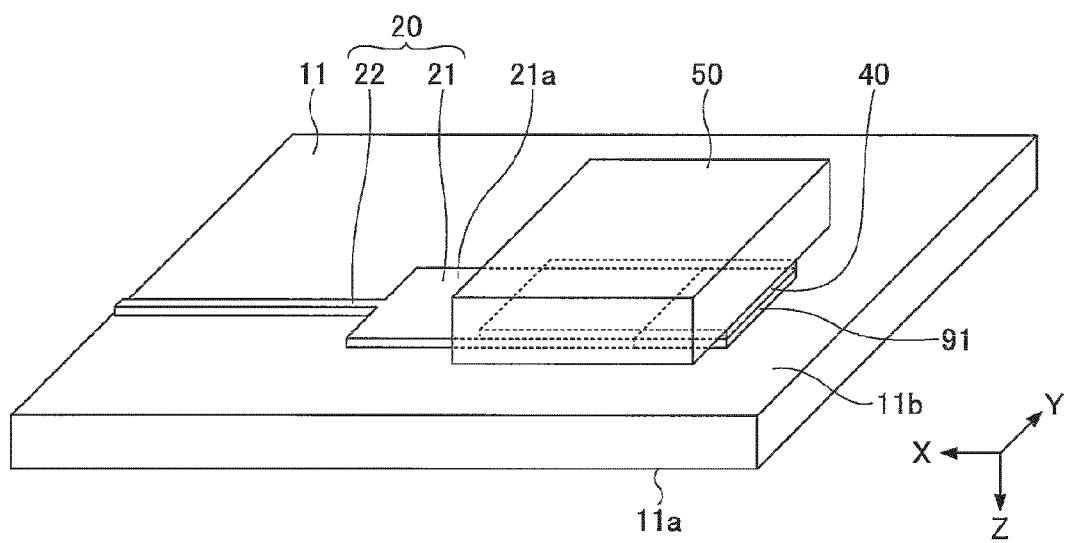
FIG. 5 is a perspective view of the resin film whose electrical conductive portion is interposed between the object to have power fed and a resin sheet.

As illustrated in FIG. 5, a stacking step of step S2 of FIG. 3 is a step of stacking the resin film 11 and the resin sheet 50 such that the electrical conductive portion 40 is interposed between the surface 21a of the power feeding portion 21 of the electrical conductor pattern 20 and the resin sheet 50. The surface 21a is a surface at the outside of the vehicle that is opposite from the resin film 11. The stacking step of step S2 is a step of stacking the resin sheet 50 at which the electrical conductive portion 40 is formed on the inside surface 11b of the resin film 11 such that the electrical conductive portion 40 and the power feeding portion 21 make contact, for example.

Figure 6:
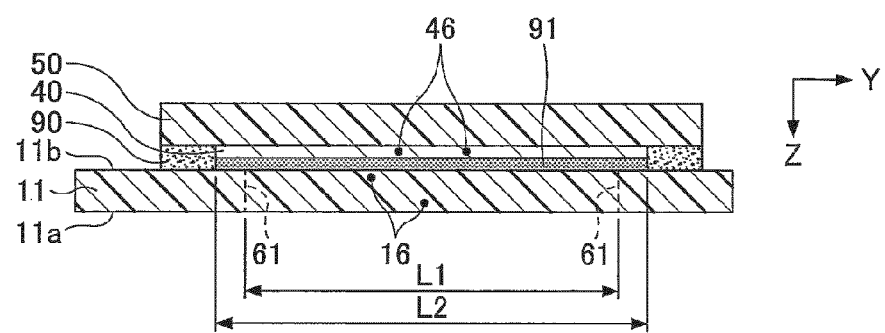
FIG. 6 is a partial cross-sectional view of the resin film whose electrical conductive portion is interposed between the object to have power fed and the resin sheet.

FIG. 6 is a cross-sectional view at a YZ plane seen from an X axis direction of FIG. 5. When stacking the resin sheet 50 on the resin film 11, the resin sheet 50 is temporarily adhered at the inside surface 11b of the resin film 11 by an adhering portion 90 (the adhering portion 90 is not illustrated in FIG. 5 for explanation purposes). By the adhering portion 90, the resin sheet 50 is prevented from being separated from the resin film 11 in a setting step of step S3, which will be explained later. As a specific example of the adhering portion 90, a double sided tape or an adhesive material may be used.

Further, the adhering portion 90 may be a portion at which the resin sheet 50 and the resin film 11 are adhered by heat. For example, when overlapping the resin sheet 50 and the resin film 11, by heating the resin sheet 50 and the resin film 11 in the thickness direction Z, the resin sheet 50 and the resin film 11 can be thermally adhered (stuck) by the adhering portion 90.

Further, the stacking step of step S2 may include a step of providing a tape for peeling 91 between the electrical conductive portion 40 and the resin film 11. The tape for peeling 91 is an adhesion suppressing member that suppresses adhesion of the resin component 46 contained in the electrical conductive portion 40 and the resin component 16 contained in the resin film 11 by the heat and the pressure in an injection molding step S4, which will be explained later. By providing the tape for peeling 91 between the electrical conductive portion 40 and the resin film 11, the electrical conductive portion 40 and the resin film 11 can be prevented from directly contacting by the heat and the pressure at the injection molding. The adhesion suppressing member such as the tape for peeling 91 or the like has a melting point higher than that of the temperature (heat) at the injection molding in order not to be melted by the heat at the injection molding. It is preferable that the tape for peeling 91 is a tape made of fluroresin or polyimide.

Figure 7:
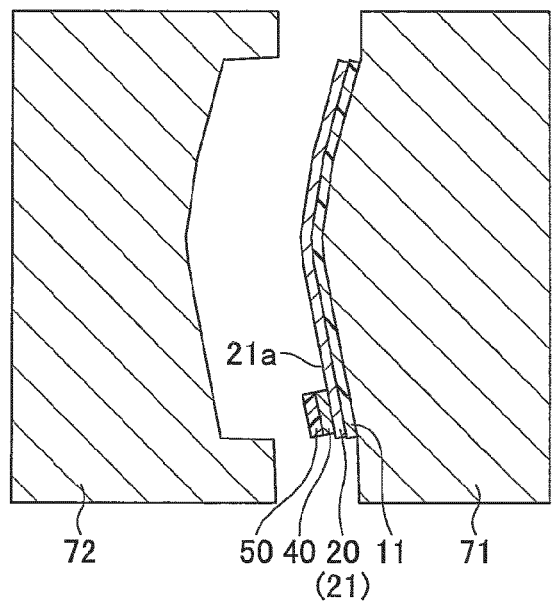
FIG. 7 is a view for explaining a state in which the resin film whose electrical conductive portion is interposed between the object to have power fed and the resin sheet is set at an injection die.

As illustrated in FIG. 7, the setting step of step S3 of FIG. 3 is a step of setting the resin film 11 in which the resin sheet 50 with the electrical conductive portion 40 is stacked and adhered to the surface 21a of the power feeding portion 21 of the electrical conductor pattern 20, in an injection die for manufacturing the plate body with a power feeding structure. The injection die is a die including a first die 71 and a second die 72, for example. The resin film 11 is set in a die (cavity) of the first die 71 and the second die 72 while being aligned at the first die 71. As a means of aligning the resin film 11 at the first die 71, electrostatic, a magnet, a pin or the like may be used, for example.

Figure 8:
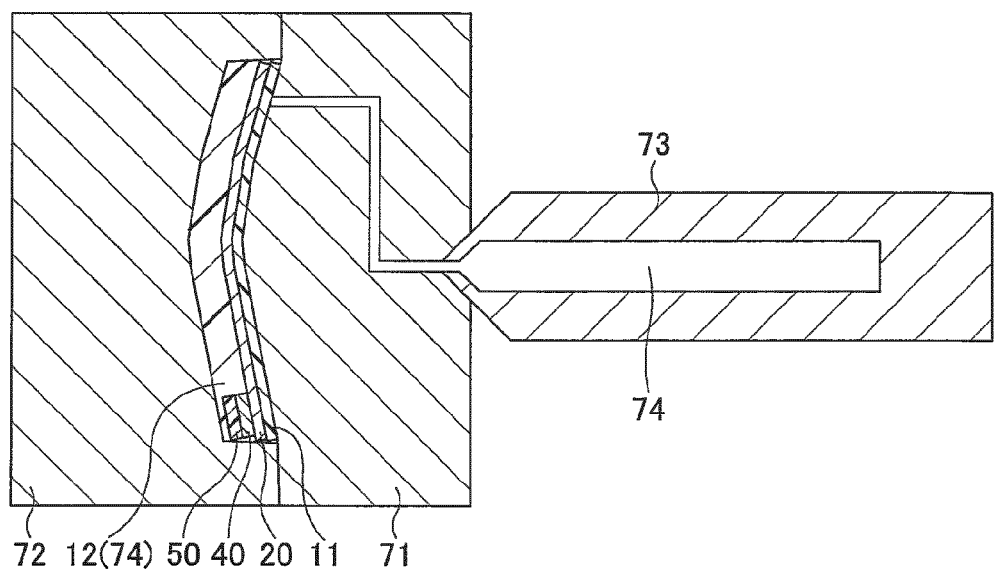
FIG. 8 is a view for explaining a state in which molten resin is injected in the injection die and is molded.

As illustrated in FIG. 8, the injection molding step of step S4 of FIG. 3 is a step of molding by injecting a molten resin 74 (molten polycarbonate, for example) in the die (in the cavity) of the first die 71 and the second die 72. After a mold closing step in which the first die 71 and the second die 72 at which the resin film 11 is set are closed and a mold clamping step in which the first die 71 and the second die 72 are clamped are performed, the molten resin 74 reserved in a heating cylinder 73 is injected and filled in the cavity.

As the resin component 26 contained in the power feeding portion 21 of the electrical conductor pattern 20 and the resin component 46 contained in the electrical conductive portion 40 are adhered (stuck) by the heat at the injection molding, adhesion strength between the power feeding portion 21 and the electrical conductive portion 40 can be increased. Thereafter, after the molten resin 74 is cooled and solidified, a removing step of opening the first die 71 and the second die 72 is performed and an injection molded part is obtained. With this configuration, the resin panel 12 is formed when the molten resin 74 is solidified (see FIG. 9).

By providing the tape for peeling 91 between the electrical conductive portion 40 and the resin film 11, adhesion of the resin component 46 contained in the electrical conductive portion 40 and the resin component 16 contained in the resin film 11 by the heat and the pressure at the injection molding can be suppressed.

Further, as both of the resin sheet 50 and the resin panel 12 contain resin components, respectively, compatibility between the resin components contained in the resin sheet 50 and the resin panel 12, respectively, is high. Thus, even when the resin sheet 50 is injection molded such that to be encapsulated in the resin panel 12, a sufficient adhesion between the resin sheet 50 and the resin panel 12 can be ensured.

Each of the resin component 26 contained in the electrical conductor pattern 20 and the resin component 46 contained in the electrical conductive portion 40 has a melting point lower than that of a resin material (the resin panel 12, the resin sheet 50, the resin film 11 or the like, for example) that contacts the electrical conductor pattern 20 or the electrical conductive portion 40. It is for preventing the resin material that contacts the conductor pattern 20 or the electrical conductive portion 40 from being melted by the heat at the injection molding before the resin components 26 and 46 are melted.

Further, each of the resin components 26 and 46 has a melting point higher than the temperature at which the power feeding component 30 or the contacting portion 31 is attached to the resin plate body for window 10 in a providing step of step S6, which will be explained later.

When being attached by solder, each of the resin components 26 and 46 has a melting point higher than 150° C. to 200° C. This is to prevent the resin components 26 and 46 from being melted by the attaching temperature of the power feeding component 30 or the like.

Further, it is preferable that each of the resin components 26 and 46 has a thermoplastic property. By having the thermoplastic property, it is easier for the electrical conductive portion 40 and the electrical conductor pattern 20 to deform in accordance with the deformation of the resin material that contacts the electrical conductor pattern 20 and the electrical conductive portion 40 due to heat expansion, respectively. With this, adhesion stability between the electrical conductive portion 40 and the electrical conductor pattern 20 can be improved. As the thermoplastic resin component, polyester, polyvinyl chloride, acrylate resin, polyolefin or the like may be used, for example.

Further, each of the electrical conductor pattern 20 and the electrical conductive portion 40 contains a metal component in addition to the resin component. The electrical conductor pattern 20 contains a metal component 27 and the electrical conductive portion 40 contains a metal component 47.

When weight of the metal component 27 is "α" and weight of the resin component 26 is "β", it is preferable that the electrical conductor pattern 20 contains the metal component 27 and the resin component 26 by a weight ratio of $$(\alpha/\beta) = \text{greater than or equal to}(7/3) \text{less than or equal to}(19/1) \quad \text{(Equation 1),}$$

more preferably, $$(\alpha/\alpha) = \text{greater than or equal to}(8/2) \text{and less than or equal to}(15/1) \quad \text{(Equation 2), and}$$

furthermore preferably, $$(\alpha/\beta) = (9/1) \quad \text{(Equation 3).}$$

Similarly, when weight of the metal component 47 is "α" and weight of the resin component 46 is "β", it is preferable that the electrical conductive portion 40 contains the metal component 47 and the resin component 46 by the ratio of the Equation 1, the Equation 2 or the Equation 3.

When each of the electrical conductor pattern 20 and the electrical conductive portion 40 contains the metal component and the resin component by such a weight ratio, an effect to increase the adhesion stability between the electrical conductor pattern 20 and the electrical conductive portion 40 becomes large. As a specific example of the metal components 27 and 47, in an order having a higher effect of increasing stability, gold, silver, copper or the like may be used.

Figure 9:
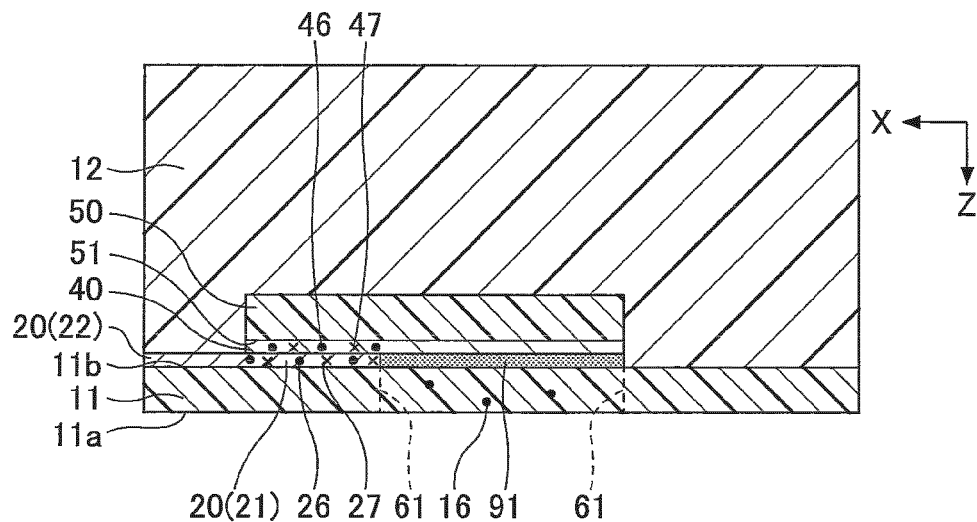
FIG. 9 is a partial cross-sectional view of the resin plate body for window at a state after injection molding is performed and before a power feeding hole is formed.
Figure 10:
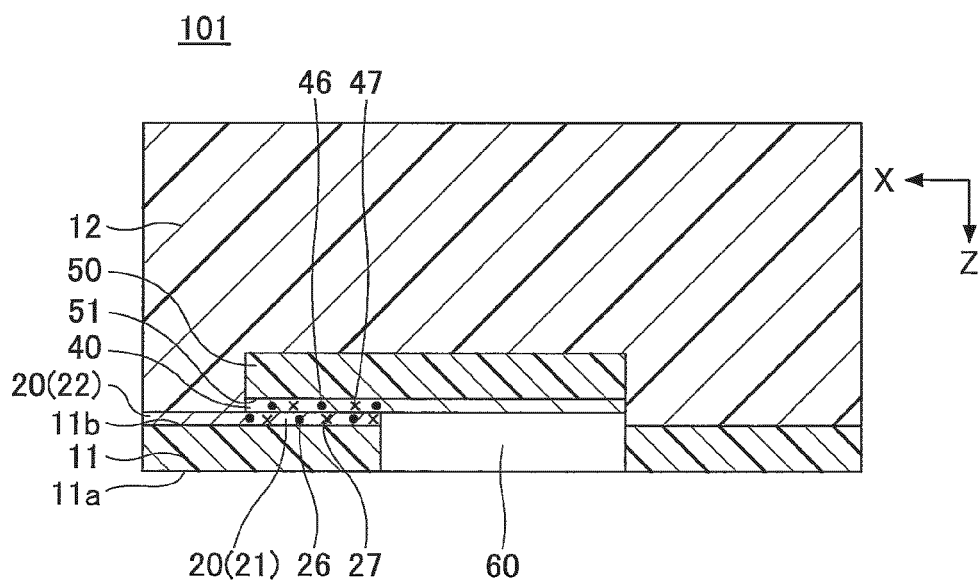
FIG. 10 is a partial cross-sectional view of the resin plate body for window at a state in which the power feeding hole is formed.

As illustrated in FIG. 9 and FIG. 10, a step of forming a hole of step S5 of FIG. 3 is a step of forming the power feeding hole 60 by linearly penetrating the resin film 11 from the outside surface 11a to reach the electrical conductive portion 40. With this, a plate body with power feeding structure 101 is obtained.

The step of forming hole of step S5 is performed after the injection molding step of step S4. If the step of forming hole is performed before the injection molding step, a deformation amount of the electrical conductive portion 40 in a convex shape toward the power feeding hole 60 in the injection molding tends to become large, and the adhesion stability between the electrical conductive portion 40 and the electrical conductor pattern 20 tends to be lowered. On the other hand, if the step of forming hole is performed after the injection molding step, the deformation amount of the electrical conductive portion 40 in the injection molding can be suppressed, and it is possible to suppress lowering of the adhesion stability between the electrical conductive portion 40 and the electrical conductor pattern 20.

Further, in order to facilitate forming of a hole in the step of forming hole, a tape for peeling 91 (see FIG. 9) is interposed between the electrical conductive portion 40 and the resin film 11. Due to the tape for peeling 91, the resin component 46 contained in the electrical conductive portion 40 and the resin component 16 contained in the resin film 11 are suppressed to be adhered by the heat and the pressure at the injection molding. Thus, the resin film 11 can be easily removed by peeling. By removing the resin film 11 by peeling, the power feeding hole 60 of FIG. 10 can be easily formed.

Further, in order to facilitate forming of the hole in the step of forming hole, it is preferable that a cut portion 61 such as perforation or the like (see FIG. 4, FIG. 9) is formed in the resin film 11 in the preparing step of step S1. By previously forming the cut portion 61, the resin film 11 can be easily removed by peeling along the cut portion 61 at a state of FIG. 9. By removing the resin film 11 by peeling along the cut portion 61, the power feeding hole 60 of FIG. 10 can be easily formed.

Further, as illustrated in FIG. 6, it is preferable that the cut portion 61 has an outline width L1 that is narrower than an outline width L2 of a portion of the electrical conductive portion 40 that is not adhered to the power feeding portion 21. Although FIG. 6 illustrates outline widths in a direction that is in parallel to a Y axis, it is preferable that the cut portion 61 has an outline width narrower than an outline width of the electrical conductive portion 40 that is not adhered to the power feeding portion 21 in each of the directions in an XY plane. With this, the resin sheet 50 is prevented from being adhered to the resin film 11 at a portion of the cut portion 61 in the injection molding, and the resin film 11 can be easily peeled along the cut portion 61.

Figure 11:
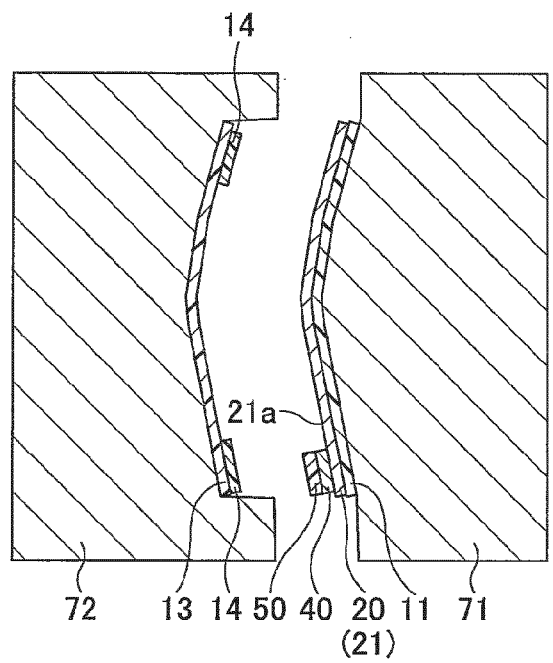
FIG. 11 is a view for explaining a state in which a film with a concealing layer is set at the injection die.
Figure 12:
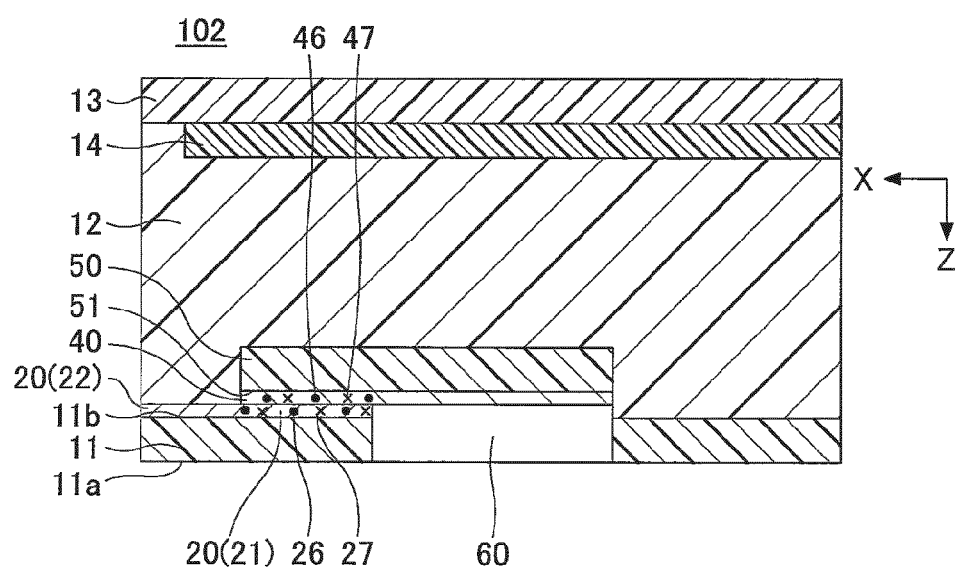
FIG. 12 is a partial cross-sectional view of the resin plate body for window including the power feeding structure with the concealing layer.

Further, as illustrated in FIG. 11, in the setting step of step S3 of FIG. 3, the film with the concealing layer 13 at which the concealing layer 14 that conceals the power feeding portion 21 and the electrical conductive portion 40 in a plan view is planarly formed may be set at the second die 72 such that to be positioned opposite from the power feeding portion 21 with respect to the electrical conductive portion 40. With this, by performing the injection molding step similarly as described above, as illustrated in FIG. 12, the film with the concealing layer 13 is integrally formed with the resin panel 12 and a plate body with power feeding structure 102 in which the concealing layer 14 is formed is obtained.

Figure 13:
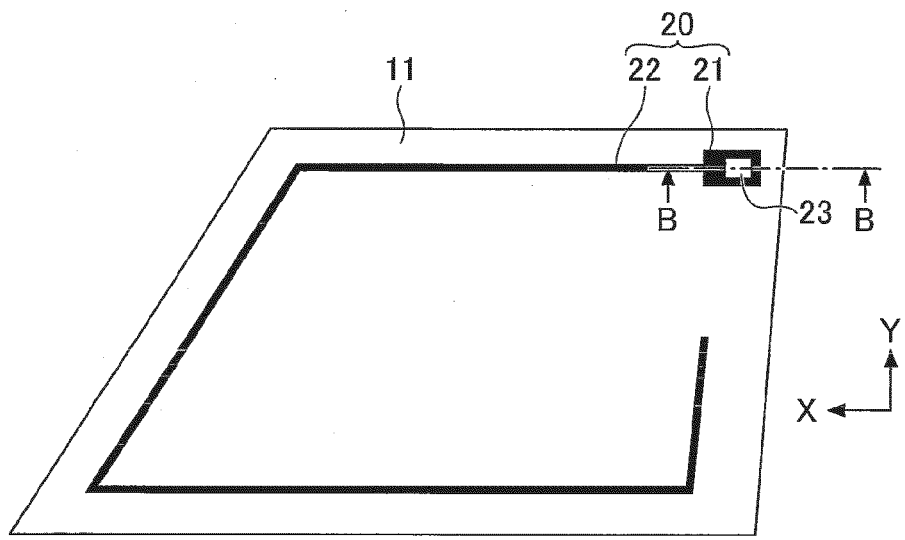
FIG. 13 is a plan view of the resin plate body for window including the power feeding structure of another embodiment.
Figure 14:
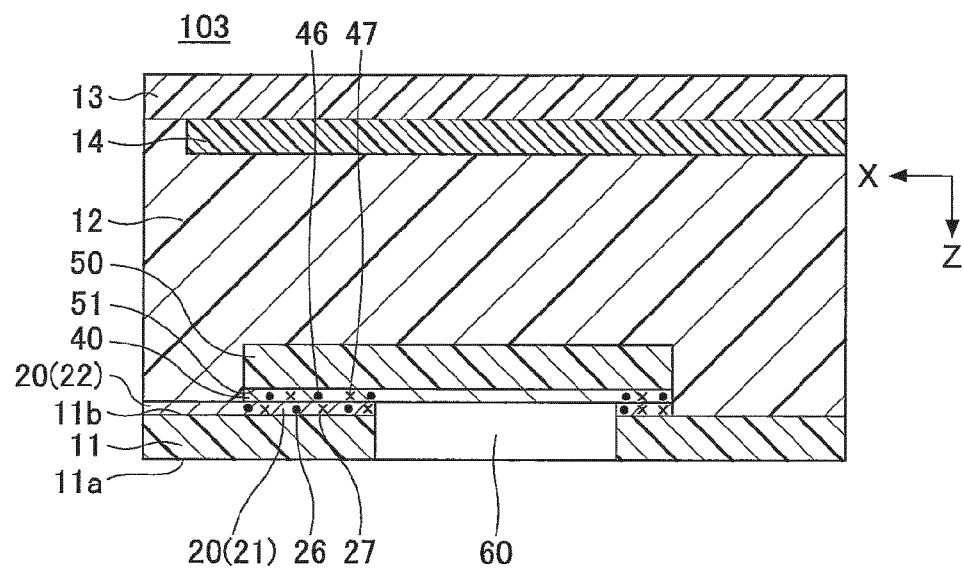
FIG. 14 is a partial cross-sectional view of the resin plate body for window including the power feeding structure of the other embodiment.

Further, as illustrated in FIG. 13, when a portion 23 at which an electrical conductor is not formed and surrounded by the power feeding portion 21 is formed in the preparing step of step S1 of FIG. 3, as illustrated in FIG. 14, by performing the step of forming hole of step S5, the power feeding hole 60 that penetrates the resin film 11 and the power feeding portion 21 is formed and a plate body with power feeding structure 103 is obtained.

As illustrated in FIG. 2, a providing step of the power feeding component of step S6 of FIG. 3 is a step of providing the power feeding component 30 at the outside surface 11*a* of the resin film 11 so as to be electrically connected to the power feeding portion 21 via the power feeding hole 60 and the electrical conductive portion 40. For example, the power feeding component 30 is provided at the outside surface 11*a* of the resin film 11 to conductively contact the electrical conductive portion 40 via the power feeding hole 60. For example, the power feeding component 30 is fixed to the resin plate body for window 10 by being adhered at the outside surface 11*a* by the adhesive material 41.

(Structure of Plate Body with Power Feeding Structure 200)

Next, a plate body with a power feeding structure 200 including a power feeding structure different from that of the plate body with the power feeding structure 100 is described. For the plate body with power feeding structure and the method of manufacturing the plate body with power feeding structure, components same as those of the plate body with the power feeding structure 100 are given the same reference numerals, and explanations are not repeated.

Figure 15:
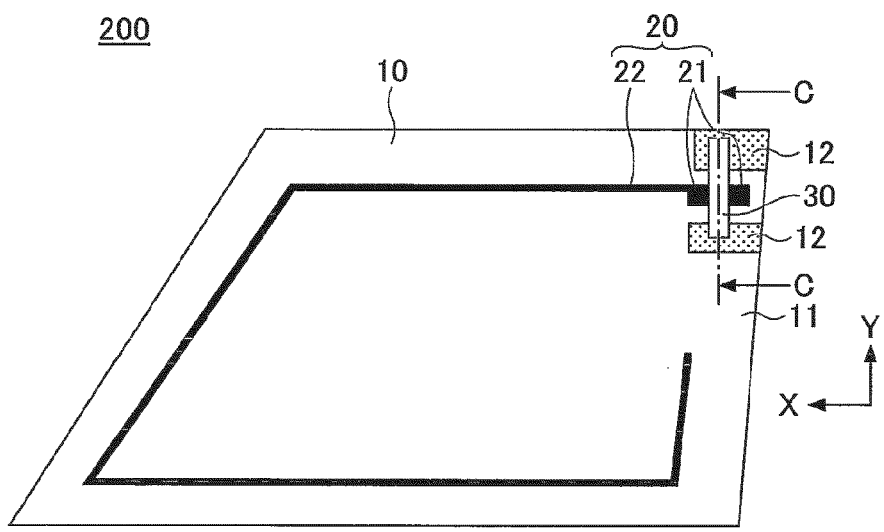
FIG. 15 is a plan view of the resin plate body for window including the power feeding structure of yet another embodiment.

FIG. 15 is a plan view of a plate body with a power feeding structure 200 of an embodiment. The plate body with the power feeding structure 200 is different from the plate body with the power feeding structure 100 of FIG. 1 in an embodiment of providing the resin plate body for window 10 and the power feeding component 30. A notch or a hole is provided at a part of the resin film 11 at a periphery of the power feeding portion 21.

Figure 16:
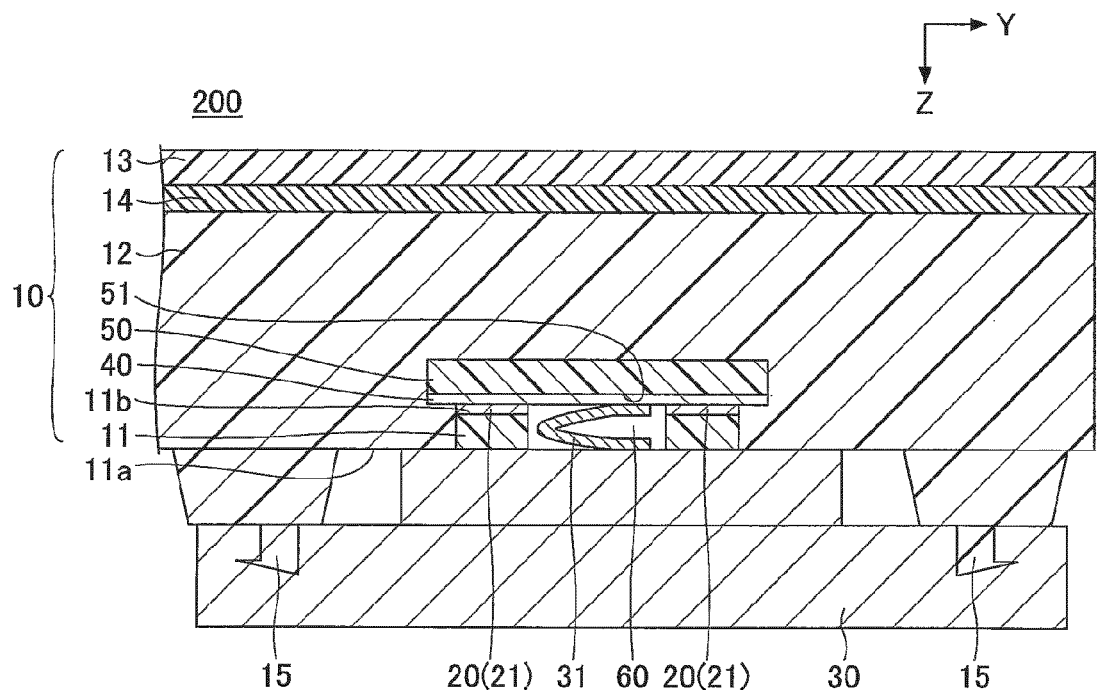
FIG. 16 is a partial cross-sectional view of the resin plate body for window including the power feeding structure of the other embodiment.

FIG. 16 is a cross-sectional view illustrating the plate body with the power feeding structure 200, and is a C-C cross-section of FIG. 15. A bracket 15 is integrally formed with the resin panel 12 of the resin plate body for window 10. The bracket 15 provided at the resin plate body for window 10 is an attaching leg for fixing the power feeding component 30 to the outside surface 11*a* of the resin film 11, and includes a hooking portion for hooking and fixing the power feeding component 30, for example. The power feeding component 30 is provided at the outside surface 11*a* of the resin film 11 via the bracket 15. It is preferable that the bracket 15 is integrally injection molded with the resin panel 12 of the resin plate body for window 10 with the resin panel 12 in the injection molding step of step S4 of FIG. 3. By providing the bracket 15 with the resin panel 12 by the injection molding, cost can be reduced compared with a case when separately providing the bracket 15.

Although a preferred embodiment of the power feeding structure, the resin plate body for window including the power feeding structure, and the method of manufacturing the resin plate body for window including the power feeding structure has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

What is claimed is:

1. A power feeding structure comprising:
a resin plate body for window configured by stacking a resin panel and a resin film at which an object to have power fed is provided such that the object to have power fed is interposed between the resin panel and the resin film, and
an electrical conductive portion that contacts the object to have power fed and is provided inside the resin plate body for window,
the power feeding structure feeding power to the object to have power fed via the electrical conductive portion,
the electrical conductive portion being provided at a resin sheet,
the resin sheet being provided inside the plate body such that the electrical conductive portion is interposed between the resin sheet and the object to have power fed,
the resin panel and the resin sheet being adhered, and
resin components contained in the object to have power fed and the electrical conductive portion, respectively, being adhered with each other.

2. The power feeding structure according to claim 1, wherein the electrical conductive portion is a printed electrical conductor formed at a surface of the resin sheet.

3. The power feeding structure according to claim 1, wherein each of the resin components has a thermoplastic property.

4. The power feeding structure according to claim 1, wherein each of the resin components has a melting point lower than that of a resin material that contacts the object to have power fed or the electrical conductive portion.

5. The power feeding structure according to claim 1, wherein each of the object to have power fed and the electrical conductive portion contains a metal component in addition to the respective resin component, and contains the metal component and the resin component by a weight ratio of
$\alpha/\beta$, which is greater than or equal to 7/3 and less than or equal to 19/1, where weight of the metal component is "a" and weight of the resin component is "β".

6. The power feeding structure according to claim 1, wherein the power feeding structure is provided with a power feeding hole formed from a surface of the plate body to reach the electrical conductive portion.

7. The power feeding structure according to claim 6, further comprising a power feeding component electrically connected to the object to have power fed via the power feeding hole and the electrical conductive portion.

8. The power feeding structure according to claim 7, wherein the power feeding component is provided at a surface of the plate body at which the power feeding hole is formed via a bracket provided at the plate body.

9. A resin plate body for window comprising the power feeding structure according to claim 1.

10. A method of manufacturing a resin plate body for window including a power feeding structure, comprising:
a preparing step of preparing a resin film at which an object to have power fed is provided, and a resin sheet at which an electrical conductive portion is provided;
a stacking step of stacking the resin film and the resin sheet such that the electrical conductive portion is interposed between the object to have power fed and the resin sheet;
a setting step of setting the resin film on which the resin sheet is stacked at an injection die;
an injection molding step of injecting molten resin in the injection die; and a step of forming hole, after the injection molding step, of forming a power feeding hole from a surface of the resin film to reach the electrical conductive portion.

11. The method of manufacturing the resin plate body for window including the power feeding structure according to claim 10,
wherein a cut portion for forming the hole in the step of forming hole is formed at the resin film in the preparing step.

12. The method of manufacturing the resin plate body for window including the power feeding structure according to claim 11,
wherein the cut portion has an outline width narrower than that of the electrical conductive portion.

13. The method of manufacturing the resin plate body for window including the power feeding structure according to claim 10,
wherein an adhesion suppressing member that suppresses adhesion of resin components contained in the electrical conductive portion and the resin film, respectively, in the injection molding step is provided between the electrical conductive portion and the resin film in the stacking step.

14. The method of manufacturing the resin plate body for window including the power feeding structure according to claim 10, further comprising a providing step of providing a power feeding component so as to be electrically connected to the object to have power fed via the power feeding hole and the electrical conductive portion after the injection molding step.

15. The method of manufacturing the resin plate body for window including the power feeding structure according to claim 10,
wherein a bracket is integrally formed with the resin plate body for window that fixes a power feeding component in the injection molding step.

* * * * *